(12) United States Patent
Donescu et al.

(10) Patent No.: US 7,499,546 B2
(45) Date of Patent: Mar. 3, 2009

(54) INSERTION OF SUPPLEMENTARY INFORMATION IN DIGITAL DATA

(75) Inventors: Ioana Donescu, Rennes (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 734 days.

(21) Appl. No.: 10/415,500

(22) PCT Filed: Oct. 31, 2001

(86) PCT No.: PCT/IB01/02746

§ 371 (c)(1),
(2), (4) Date: Apr. 30, 2003

(87) PCT Pub. No.: WO02/37833

PCT Pub. Date: May 10, 2002

(65) Prior Publication Data

US 2004/0012820 A1    Jan. 22, 2004

(51) Int. Cl.
*H04N 7/167* (2006.01)
(52) U.S. Cl. .................. 380/217; 380/210; 380/200
(58) Field of Classification Search .............. None
See application file for complete search history.

(56) References Cited

U.S. PATENT DOCUMENTS

| | | | | |
|---|---|---|---|---|
| 4,546,342 A * | 10/1985 | Weaver et al. | ........ | 341/51 |
| 5,754,236 A | 5/1998 | Lee | ........ | 348/405 |
| 6,215,422 B1 * | 4/2001 | Henry et al. | ........ | 341/51 |
| 6,501,860 B1 * | 12/2002 | Charrier et al. | ........ | 382/240 |
| 2002/0048319 A1 | 4/2002 | Onno | ........ | 375/240 |
| 2002/0051560 A1 | 5/2002 | Donescu et al. | ........ | 382/100 |
| 2002/0051583 A1 | 5/2002 | Brown et al. | ........ | 382/299 |
| 2002/0191852 A1 | 12/2002 | Le Leannec et al. | ........ | 382/233 |
| 2003/0018750 A1 | 1/2003 | Onno et al. | ........ | 709/219 |

FOREIGN PATENT DOCUMENTS

EP    0 944 262 A2    9/1999
WO    WO 99/29114    6/1999

OTHER PUBLICATIONS

David Taubman; "High Performance Scalable Image Compression with EBCOT"; IEEE Transactions On Image Processing, vol. 9, No. 7, pp. 1158-1170, Jul. 2000.

Houng-Jyh Wang et al.; "An Integrated Progressive Image Coding And Watermark System"; Integrated Multimedia Systems Center, Department of Electrical Engineering-Systems, Univ of Southern California, pp. 3721-3724.

* cited by examiner

*Primary Examiner*—Pramila Parthasarathy
(74) *Attorney, Agent, or Firm*—Fitzpatrick, Cella, Harper & Scinto

(57) ABSTRACT

The invention concerns a method of inserting a suppementary information item in a set of data reprenting physical quantities, the data having been processed by the steps of, a) partitioning (E2) the set into subsets, b) entropic coding (E4) of each of the subsets, c) selecting (E8), for each of the subsets, a compression rate and distortion pair according to a global compression rate or a global distortion, d) writing, for each of the subsets, an index ($T_{ij}$) representing the selected compression rate and distortion pair, in a file containing the coded subsets, characterised in that it also includes a step (E11) of modifying the selected compression rate and distortion pairs, according to the supplementary information ($w_m$).

14 Claims, 7 Drawing Sheets

INSERTION OF SUPPLEMENTARY INFORMATION IN DIGITAL DATA

Figure 1:
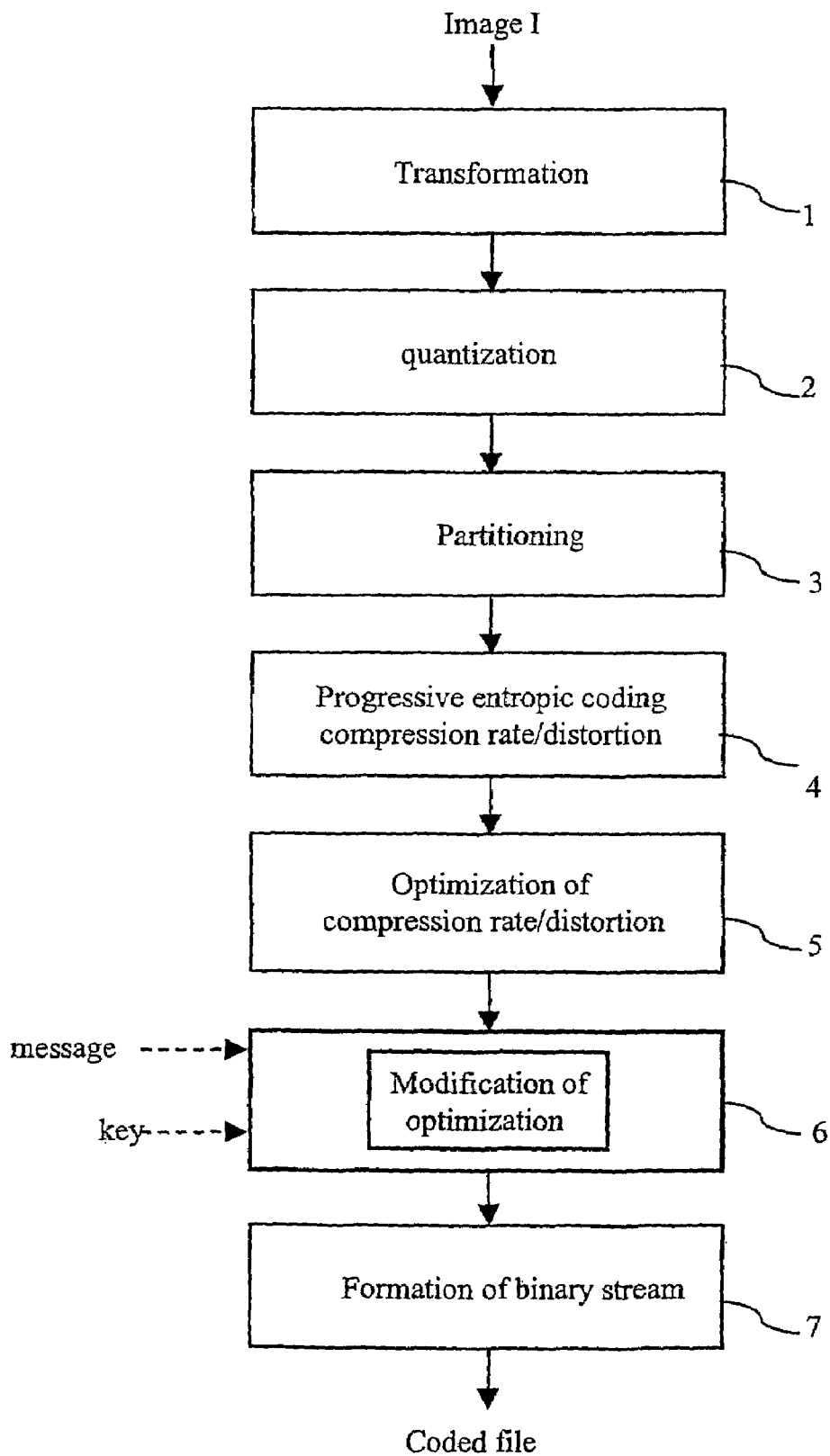

This application is a National Stage Filing Under 35 U.S.C. § 371 of International Application No. PCT/IB01/02746, filed Oct. 31, 2001, and published in English as International Publication No. WO 02/37833 A2, on May 10, 2002.

The present invention concerns a method of inserting supplementary information such as a secret watermark in a digital signal.

It also concerns a method of extracting a secret watermark inserted in a digital signal.

Correlatively, the present invention concerns a device for inserting supplementary information and a device for extracting the supplementary information, adapted respectively to implement the insertion and extraction methods according to the invention.

The digital signal considered hereinafter will more particularly be a digital image signal.

The insertion and extraction methods according to the invention lie within the technical field of watermarking of digital data, which can be interpreted as the insertion of a seal in the digital data, making it possible for example to authenticate the content of a digital data file. This watermarking is also referred to as digital tattooing.

Watermarking entails in general terms the modification of coefficients representing the digital image. This modification is imperceptible to the eye, but can be decoded by an appropriate decoder.

We are concerned here with so-called fragile watermarking, that is to say one which does not resist modifications which the image may undergo after its watermarking, such as supercompression, filtering or change in representation format, for example. This type of watermarking is notably used for authenticating an image, or for inserting therein annotations relating to this image.

In addition, the watermarking of an image can be effected either in the spatial domain, or in a transformed domain, or in a compressed representation. The concern is here more particularly with the compressed domain.

The article entitled "High performance scalable image compression with EBCOT" by D. Taubman, which appeared in "IEEE Transactions on image processing", Vol. 9, N° 7, July 2000, pages 1158 to 1170, describes a compression method which supplies a compressed representation which is scalable in terms of compression rate and distortion. The concept of scalability means that the compressed data contain several layers which each represent an effective compression of the image for a fixed compression rate or a fixed distortion.

The present invention aims to provide a method and a device for inserting supplementary information in coded data and more particularly compressed data.

To this end, the invention proposes a method of inserting supplementary information in a set of data representing physical quantities, the data having been processed by the steps of:

partitioning the set into subsets,
entropic coding of each of the subsets,
selecting, for each of the subsets, a compression rate and distortion pair according to a global compression rate or a global distortion,
writing, for each of the subsets, an index representing the selected compression rate and distortion pair, in a file containing the coded subsets, characterised in that it also includes a step of modifying the selected compression rate and distortion pairs, according to the supplementary information.

Correlatively, the invention concerns a device for inserting supplementary information in a set of data representing physical quantities, the data having been processed by:

means of partitioning the set into subsets,
means of entropic coding of each of the subsets,
means of selecting, for each of the subsets, a compression rate and distortion pair according to a global compression rate or a global distortion,
means of writing, for each of the subsets, an index representing the selected compression rate and distortion pair, in a file containing the coded subsets, characterised in that it also has means of modifying the selected compression rate and distortion pairs, according to the supplementary information.

By virtue of the invention, it is possible to effect an insertion of supplementary information, of the fragile type, in compressed data.

The data are not directly modified by this insertion, since only the compression rate and distortion pairs of the subsets are modified according to the invention.

According to a preferred characteristic, the insertion method includes, prior to the modification step, a test step for verifying whether the selected compression rate and distortion pairs are modifiable according to a modification criterion.

This ensures that the visibility of the supplementary information inserted in the data and the global compression rate after watermarking and compression are checked. In addition, this ensures compatibility of the insertion method with the compression and decompression method.

According to a preferred characteristic, the entropic coding is performed by bit plane.

According to a preferred characteristic, the modification criterion is not verified for a selected compression rate and distortion pair if this pair belongs to the first non-null bit plane.

Thus the insertion of the supplementary information does not introduce an excessive distortion in the data.

According to a preferred characteristic, the modification criterion is not verified for a selected compression rate and distortion pair if this pair belongs to the last bit plane.

In fact, this makes it possible not to create a situation in which the decoding of the data would be impossible due to incompatibility with the acceptable values.

According to a preferred characteristic, the modification includes the replacement of the least significant bit of the index with an information bit whose value is a function of the supplementary information. This type of modification is simple to implement.

According to preferred characteristics, which may be combined, the value of the information bit is also a function of at least one characteristic of the subset, or of at least one characteristic of the subsets previously processed or of a secret key.

These characteristics make the supplementary information more difficult to pirate.

According to a preferred characteristic, since the file containing the coded subsets has several layers, only the compression rate and distortion pairs corresponding to the first layer are modified according to the supplementary information.

The first layer is always the first to be processed, for example in the case of a transmission of the data. Thus the supplementary information will also be rapidly processed.

According to another preferred characteristic, since the file containing the coded subsets has several layers, the compression rate and distortion pairs corresponding to the different layers are modified according to the supplementary information.

This makes it possible for example to order the importance of the supplementary information hierarchically, the first layer receiving the information judged to be the most important.

According to another preferred characteristic, for each of the layers, the compression rate and distortion pairs are modified according to the same item of supplementary information.

The supplementary information is thus repeated on each layer, which increases the robustness of the insertion.

According to another preferred characteristic, the supplementary information is authentication information.

The invention also concerns a method of extracting supplementary information inserted in a set of data representing physical quantities by means of the insertion method previously presented, characterised in that it includes the steps of:

reading, for each of the subsets, the index representing the compression rate and distortion pair, extracting the supplementary information.

The invention concerns an extraction device having means of implementing the above characteristics.

The extraction method and device have advantages similar to those previously described.

The invention also concerns a digital apparatus including the insertion or extraction device, or means of implementing the insertion or extraction method. This digital apparatus is for example a digital photographic apparatus, a digital camcorder or a scanner. The advantages of the device of the digital apparatus are identical to those previously disclosed.

The invention also concerns an information storage means, which can be read by a computer or by a microprocessor, integrated or not into the device, possibly removable, storing a program implementing the insertion or extraction method.

The invention also concerns a computer program on a storage medium and comprising computer executable instructions for causing a computer to insert or extract supplementary information according to the previously disclosed method.

Figure 2:
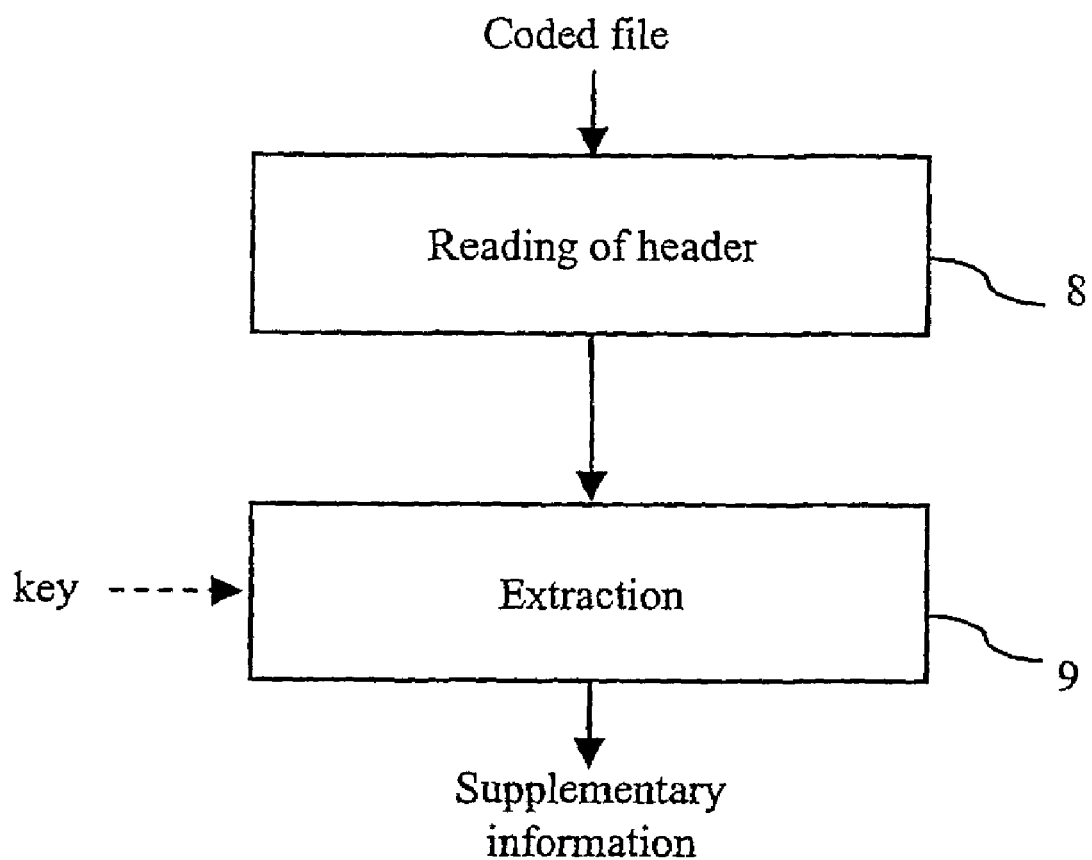
Figure 3:
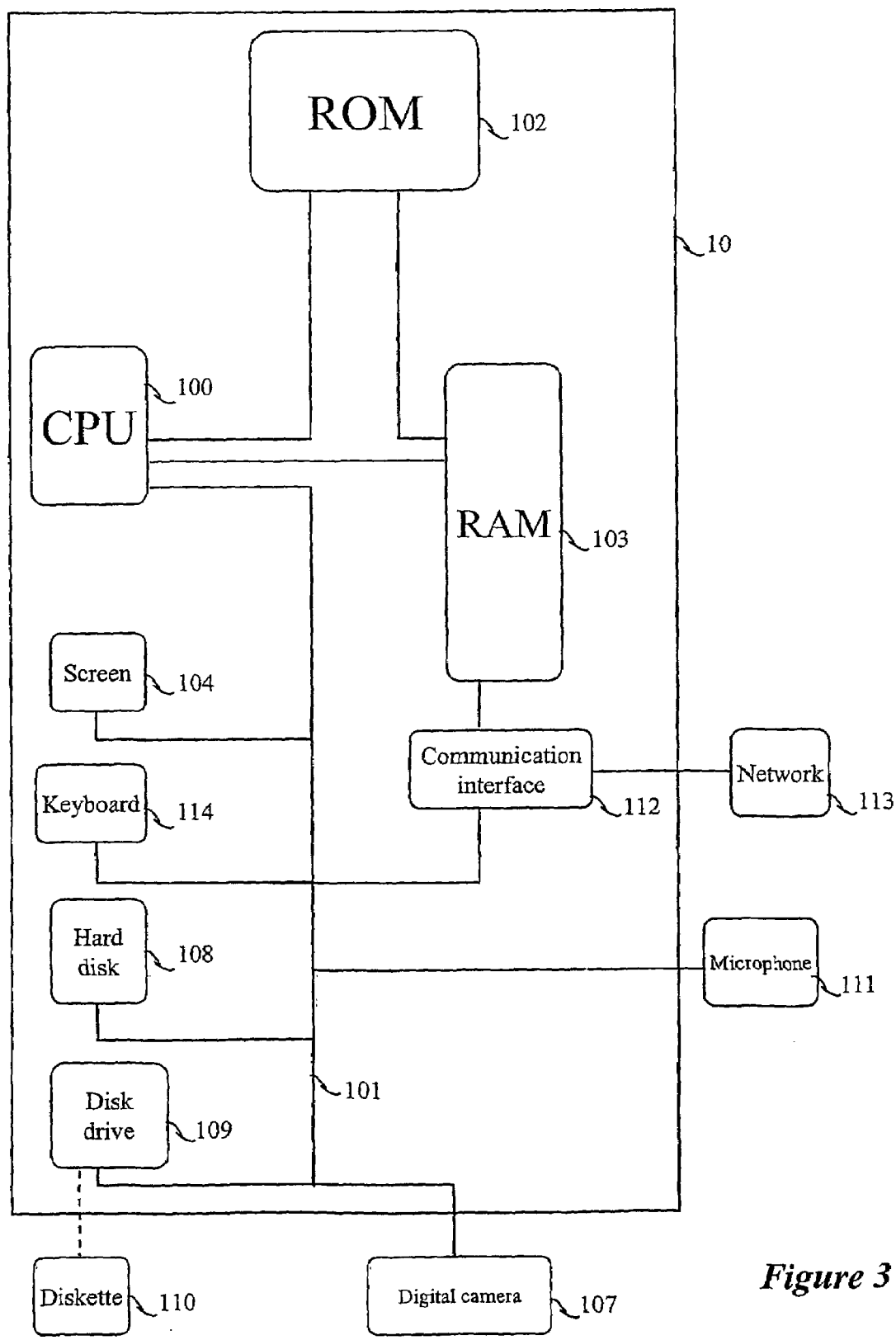
Figure 4:
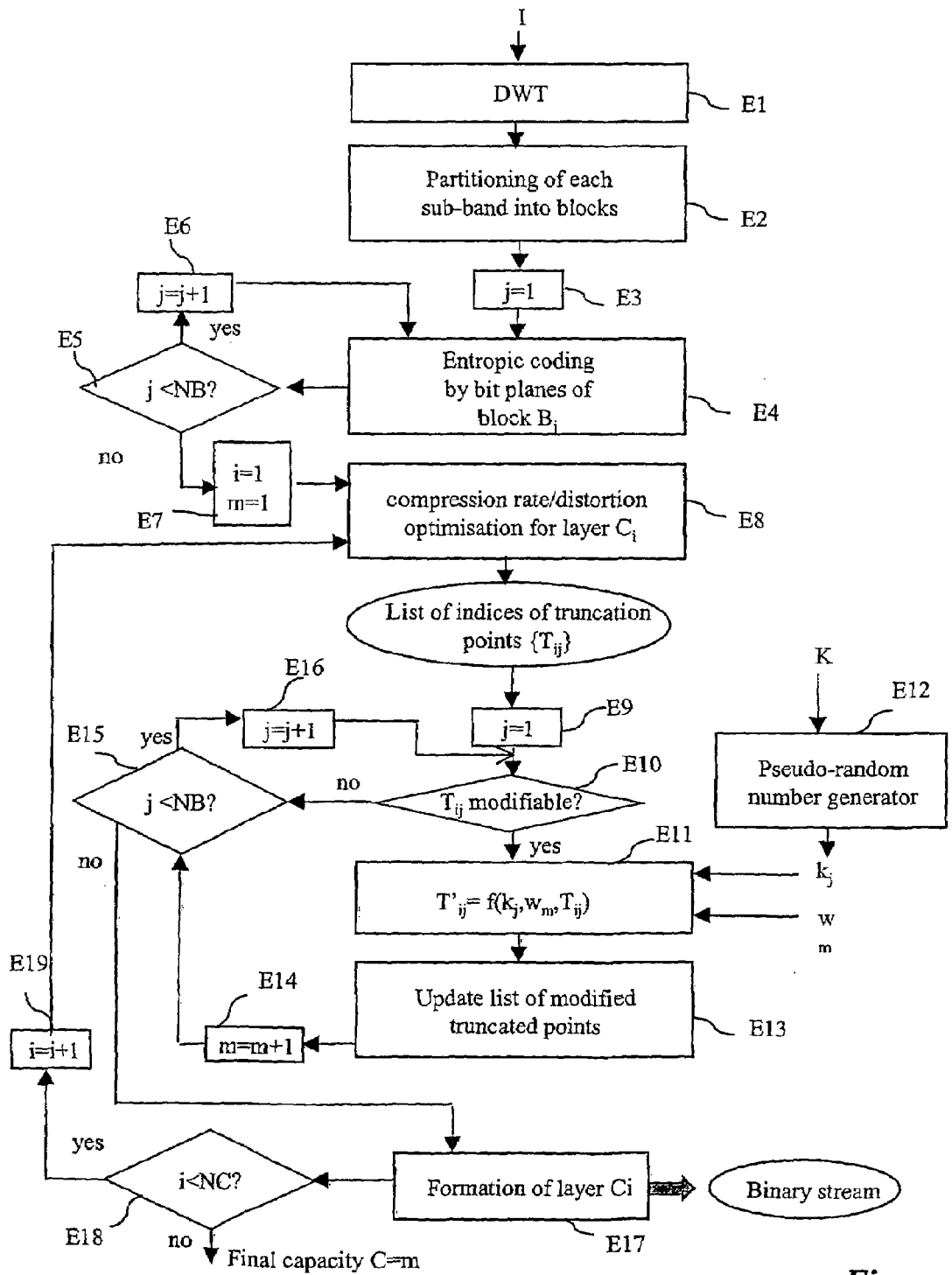
Figure 5:
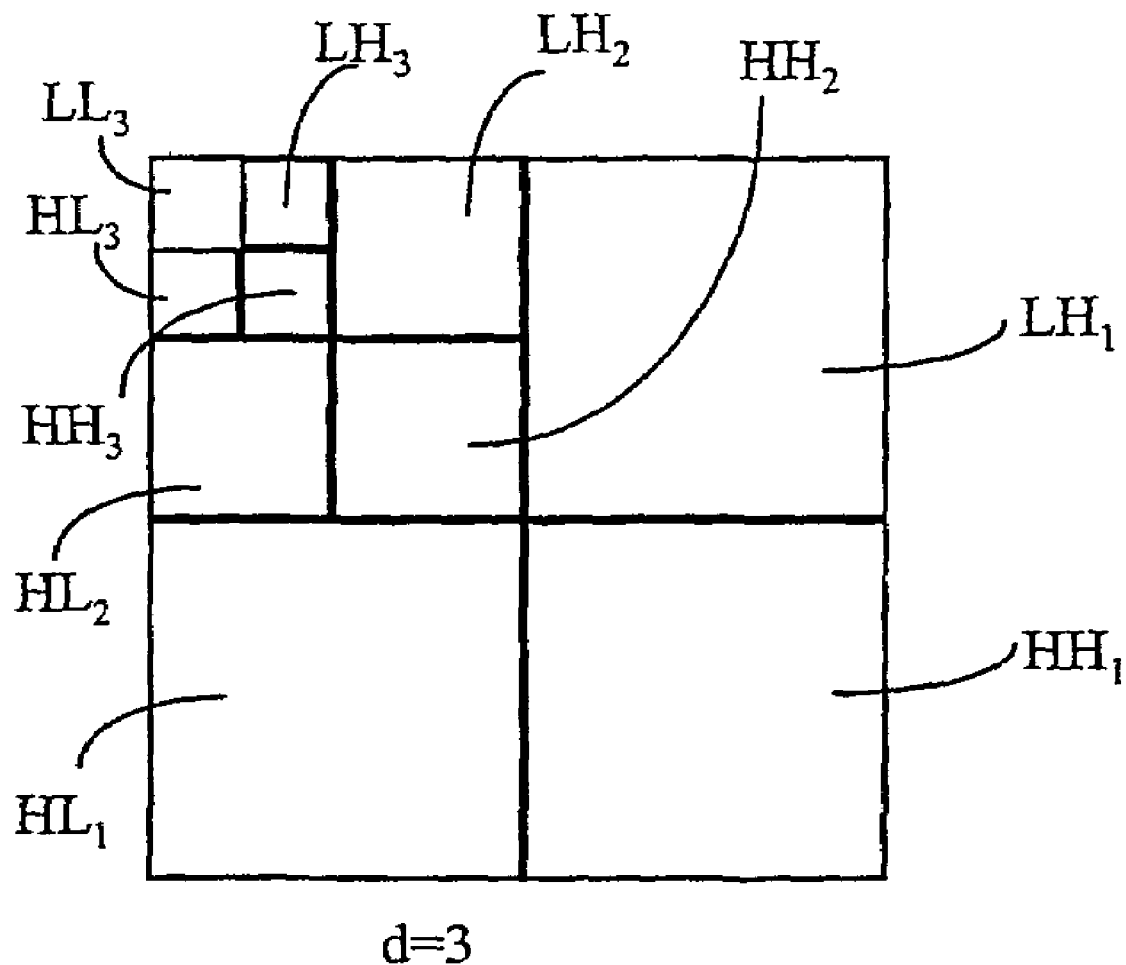
Figure 6:
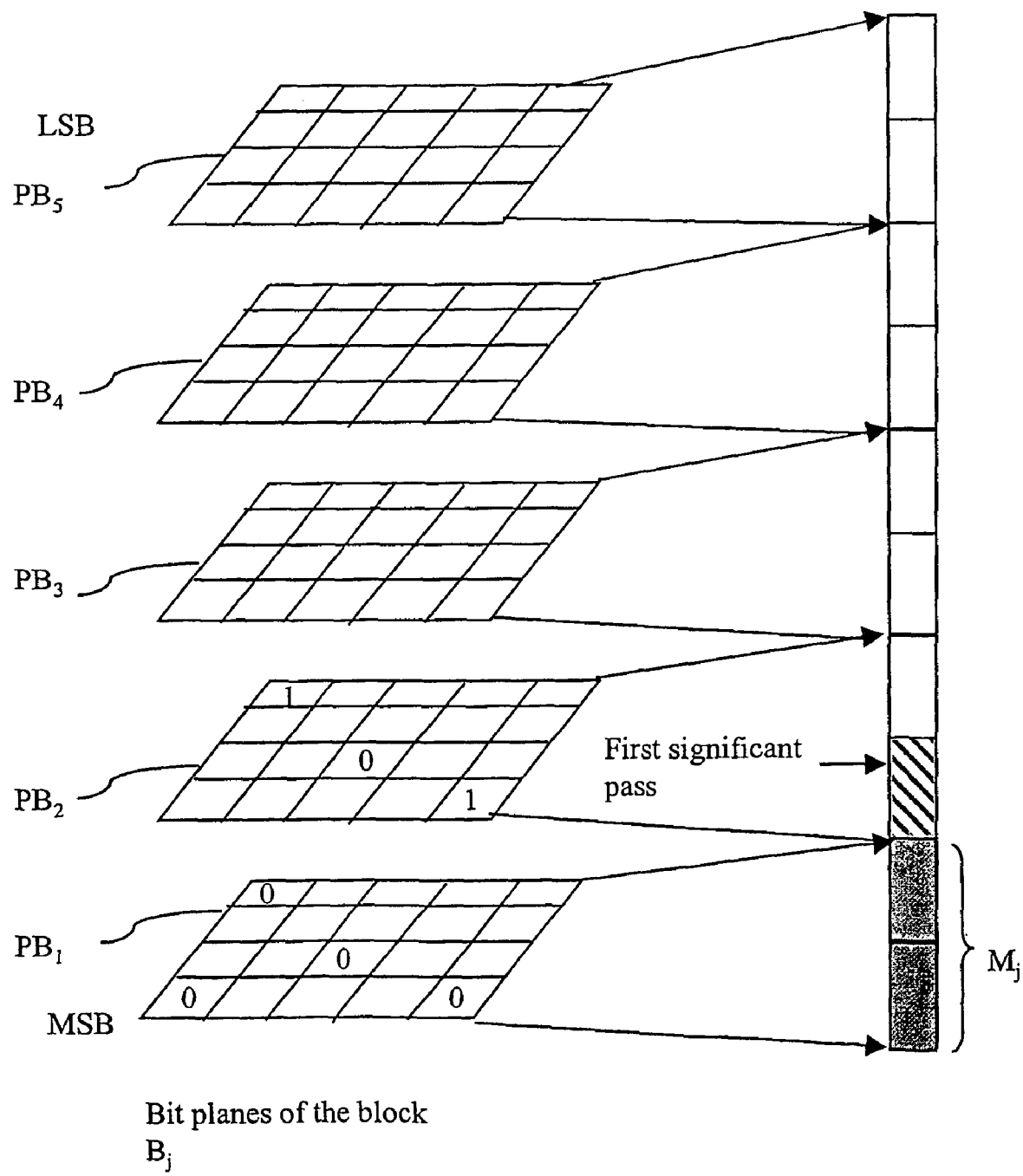
Figure 7:
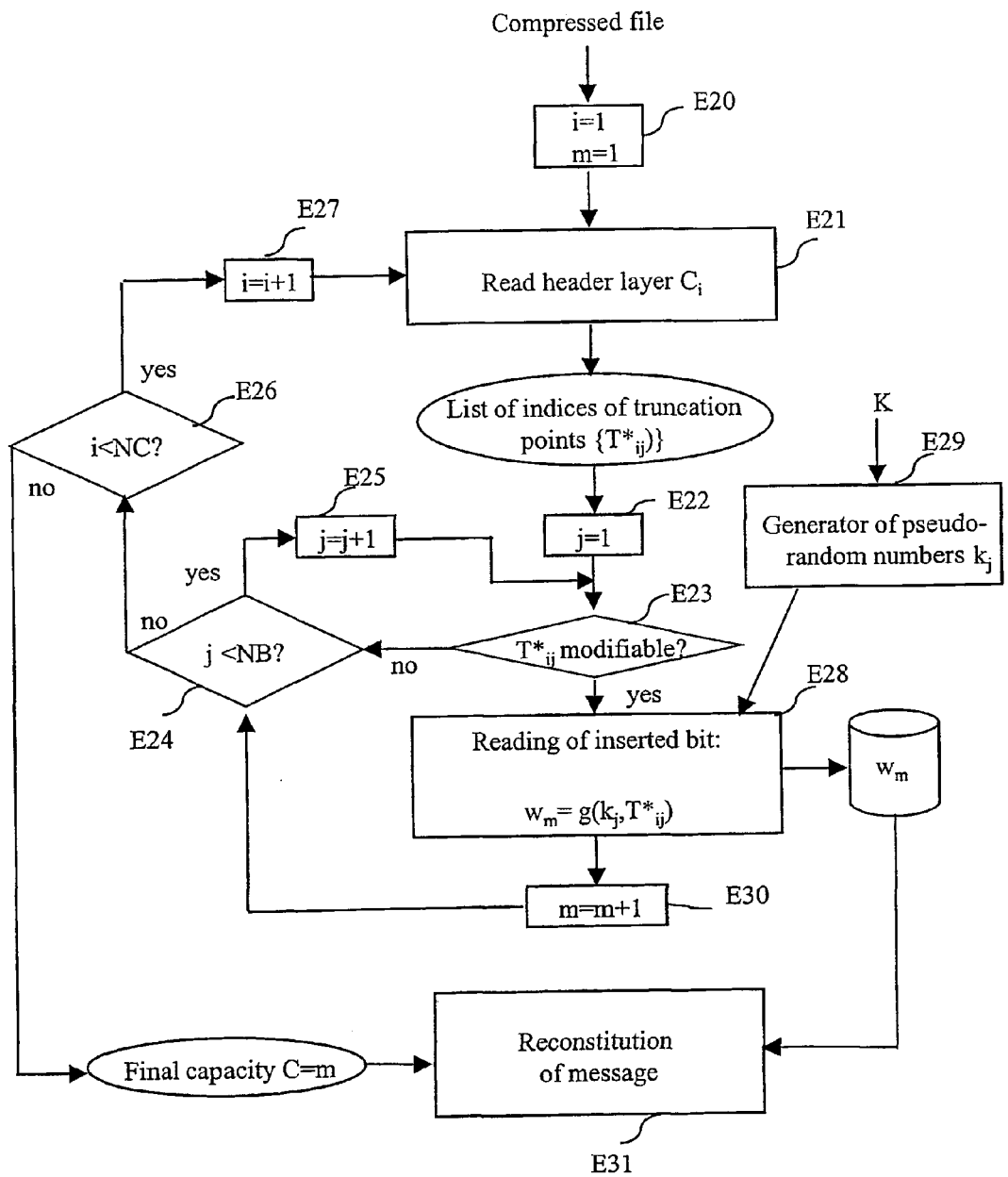

The characteristics and advantages of the present invention will emerge more clearly from a reading of a preferred embodiment illustrated by the accompanying drawings, in which:

FIG. 1 depicts an embodiment of a device for inserting a message in data according to the invention, FIG. 2 depicts an embodiment of a device for extracting a message from data according to the invention, FIG. 3 depicts an embodiment of a device according to the invention, FIG. 4 depicts an embodiment of a method of inserting a message in data according to the invention, FIG. 5 depicts a transformed image, FIG. 6 illustrates an entropic coding used in the invention, FIG. 7 depicts an embodiment of a method of extracting a message from data according to the invention.

With reference to FIG. 1, a device for inserting a message in digital data includes a data transformation circuit 1. The digital data are more particularly an image and the transformation is for example a discrete wavelet transformation of the image, which transforms the spatial coefficient thereof into spatio-frequency coefficients.

It should be noted that the transformation is essential only if it is wished to obtain a representation of the image which is both compressed and watermarked. If the compression of the image is not a sought-for aim, the transformation can be omitted or, equivalently, be identity.

The transformation circuit 1 is connected to a quantization circuit 2 which quantizes the coefficients which it receives and supplies the quantized coefficients to a partitioning circuit 3. It should be noted that quantization is not essential for the invention. The partitioning circuit forms blocks in the data which it receives.

The circuit 3 is connected to a circuit 4 for the progressive entropic coding of the blocks of data. One embodiment of entropic coding will be detailed hereinafter with reference to FIG. 6.

The circuit 4 supplies the coded data to a circuit 5 for optimising the compression rate and distortion of these data.

The circuit 5 effects the selection, for each of the blocks of data, of a compression rate and distortion pair, as a function of a global rate or a global distortion. This selection amounts to keeping only some of the coded information for each block. The quantity of coded information kept for each block is indicated by a truncation point, which is an index representing the selected compression rate and distortion pair.

The circuit 5 is connected to a circuit 6 for modifying the result of the previous optimisation, according to a message to be inserted and a secret key K. The modification relates to the truncation point of certain blocks, as will be seen hereinafter.

The circuit 6 is finally connected to a binary stream formation circuit 7, which forms a binary stream containing the inserted message. The indices of the truncation points are inserted in the header of the file containing the binary stream, referred to as the compressed file.

The binary stream contains layers, each of which is a representation, progressive in terms of quality, of the image containing coding data for each block. These coding data are entropically coded items of binary information which depend on the result of the optimisation between compression rate and distortion.

The first layer contains some of the coding data for each block, and each following layer contains additional details with respect to the first. It is said then that there is incrementation of the coded information.

Naturally it is possible to have only one layer.

The functioning of the insertion device according to the invention will be detailed hereinafter.

FIG. 2 depicts an embodiment of a device for extracting a message inserted in data by the previously disclosed device.

This device has a compressed file header reading circuit 8. This is because the inserted message is in the header of the compressed file.

The circuit 8 is connected to an extraction circuit 9, which extracts the inserted message.

The functioning of the extraction device will be detailed hereinafter. It should be noted that the purpose of the extraction may be to find the inserted message, or to authenticate the digital data, in order to check whether they have undergone any alteration between the insertion of the message and its extraction.

As depicted in FIG. 3, a device implementing the invention is for example a microcomputer 10 connected to different peripherals, for example a digital camera 107 (or a scanner, or any image acquisition or storage means) connected to a graphics card supplying information to be processed according to the invention.

The device 10 has a communication interface 112 connected to a network 113 able to transmit digital data to be processed or conversely to transmit data processed by the device. The device 10 also has a storage means 108 such as for example a hard disk. It also has a drive 109 for a disk 110. This disk 110 can be a diskette, a CD-ROM or a DVD-ROM, for example. The disk 110, like the disk 108, can contain data processed according to the invention as well as the program or programs implementing the invention which, once read by the device 10, will be stored in the hard disk 108. According to a variant, the program enabling the device to implement the invention can be stored in a read only memory 102 (referred to as ROM in the drawing). In a second variant, the program can be received and stored in an identical fashion to that described previously by means of the communication network 113.

The device 10 is connected to a microphone 111. The data to be processed according to the invention will in this case be audio signal data.

This same device has a screen 104 for displaying the data to be processed or serving as an interface with the user, who can thus parameterise certain processing modes, using the keyboard 114 or any other means (a mouse for example).

The central processing unit 100 (referred to as CPU in the drawing) executes the instructions relating to the implementation of the invention, instructions which are stored in the read only memory 102 or in the other storage elements. On powering up, the processing programs stored in a non-volatile memory, for example the ROM 102, are transferred into the random access memory RAM 103, which will then contain the executable code of the invention as well as registers for storing the variables necessary for implementing the invention.

In more general terms, an information storage means, which can be read by a computer or by a microprocessor, integrated or not into the device, and possibly removable, stores a program implementing the method according to the invention.

The communication bus 101 enables communication to be made between the different elements included in the microcomputer 10 or connected to it. The representation of the bus 101 is not limiting and notably the central unit 100 is able to communicate instructions to any element of the microcomputer 10 directly or by means of another element of the microcomputer 10.

The functioning of the watermarking insertion and watermarking detection devices according to the invention will now be described by means of algorithms.

The algorithm of FIG. 4 depicts the general functioning of the insertion device according to the invention and includes steps E1 to E19.

This algorithm can be stored in whole or in part in any information storage means capable of cooperating with the microprocessor. This storage means can be read by a computer or by a microprocessor. This storage means is integrated or not into the device, and may be removable. For example, it may include a magnetic tape, a diskette or a CD-ROM (fixed-memory compact disc).

Step E1 is a reversible transformation of the data, for example a discrete wavelet transformation of the image, referred to as, in order to transform the spatial coefficients into spatio-frequency coefficients. These spatio-frequency coefficients form part of the frequency sub-bands, distributed according to several resolution levels. Step E1 also includes a scalar quantization of the coefficients. For example a specific quantization step is used for each sub-band. This quantization is known per se and will not be detailed here.

For example, the transformation of the image results in a transformed image as depicted in FIG. 5, and which includes ten frequency sub-bands distributed according to three resolution levels.

The transformed image is the result of a filtering of the original image in the horizontal direction and in the vertical direction.

The level of lowest resolution $RES_3$ includes the sub-bands $LL_3$, $HL_3$, $LH_3$ and $HH_3$. The sub-band $LL_3$ with the lowest frequency, also referred to as the low sub-band, is a reduction of the original image. The other sub-bands are detail sub-bands.

The sub-band $LL_3$ includes the components, or coefficients, of low frequency, in both directions, of the image signal. The sub-band $LH_3$ includes the components of low frequency in a first direction and of high frequency in a second direction, of the image signal. The sub-band $HL_3$ includes the components of high frequency in the first direction and the components of low frequency in the second direction. Finally, the sub-band $HH_3$ includes the components of high frequency in both directions.

The second resolution level $RES_2$ includes the sub-bands $HL_2$, $LH_2$ and $HH_2$ and the highest resolution level $RES_1$ includes the sub-bands $HL_1$, $LH_1$ and $HH_1$.

Naturally, the number of resolution levels, and consequently of sub-bands, can be chosen differently, for example 13 sub-bands and four resolution levels, for a bi-dimensional signal such as an image. The number of sub-bands per resolution level can also be different.

The following step E2 is the partitioning of each sub-band into blocks of coefficients. In general terms, a block of coefficients is a group of coefficients. For example, the blocks formed are square in shape, and have a predetermined number or a predetermined size. The blocks situated on the edges of the sub-band can be rectangular and of lesser size.

The following step E3 is an initialisation of a parameter j to the value one, to consider a first block amongst the NB blocks $B_j$ formed at the previous step. The blocks are considered in any predetermined order, for example according to the video scanning direction.

The following step E4 is an entropic coding by bit plane of the current block $B_j$.

The following step E5 is a test for checking whether all the blocks have been coded. If there remains at least one block to be coded, step E5 is followed by step E6 in order to consider a following block. Step E6 is followed by the previously described step E4.

FIG. 6 illustrates the entropic coding by bit planes of a block $B_j$. Such a coding is described in the article entitled "High performance scalable image compression with EBCOT" by D. Taubman, which appeared in "IEEE Transactions on image processing", Vol. 9, N° 7, July 2000, pages 1158 to 1170. This coding is progressive, and also is of the scalable type.

Each coefficient of a block is a real number which is quantized, for example in five bits in FIG. 6. The bit plane $PB_1$, contains the most significant bits, referred to as MSB's of the coefficients of the block $B_j$. The bit planes $PB_2$ to $PB_5$ contain respectively the lesser and lesser significant bits of the coefficients of the block $B_j$. The bit plane $PB_5$ thus contains the least significant bits, referred to as LSB's of the coefficients of the block $B_j$.

Each bit plane is coded in several passes, here two.

The result of the first coding pass is a part of the coding data for the block in question, and the result of the second pass is another part of the coding data including supplementary details. With each pass there is associated a compression rate and distortion pair which corresponds to the supplementary compression rate and to the decrease in overall distortion for the reconstructed image when the corresponding data are retained.

In the example depicted, the bit plane $PB_1$ contains only zeros, and therefore it is not necessary to effect the two coding passes on this bit plane. To take account of this information, the number $M_j$ of non-significant passes is two.

The first significant pass is the first pass for the bit plane $PB_2$, that is to say the third pass.

With reference once again to FIG. 4, when all the blocks have been coded, then step E5 is followed by step E7, at which a parameter i is initialised to one and a parameter m is initialised to one.

The parameter i is an integer which is the index of the current layer amongst the previously formed layers. The parameter i varies between 1 and NC, where NC is an integer equal to the number of layers in the binary stream.

The parameter m is an integer which is the index of the inserted bit. It should be noted that the number of bits which it is possible to insert in each layer is variable, and therefore the total number, or capacity, is also variable.

Step E7 is followed by step E8 at which a compression rate and distortion optimisation algorithm determines the quantity of data to be kept in the relevant layer $C_i$, for each coded block $B_j$. This quantity of data is associated with a compression rate and distortion pair.

This algorithm is known per se, and results in a truncation point $T_{ij}$ in the relevant layer $C_i$ and for the current block $B_j$. Thus the layer $C_i$ contains the result of a certain number of coding passes for each block.

The purpose of the remainder of the algorithm is to modify the truncation points according to the supplementary information to be inserted.

The following step E9 is an initialisation of the parameter j to one in order to consider the first truncation point $T_{ij}$ in the current layer $C_i$.

The following step E10 is a test for determining whether the truncation point $T_{ij}$ is modifiable.

For this purpose, a predetermined criterion is applied. For example, the truncation point of the first coded non-null bit plane is not modifiable. This is because modifying this bit plane could make changes in the image which are too great. Likewise, the truncation point of the last bit plane is not modifiable. It is a case here of a physical limit, which, if it is not respected, could make it impossible to decode the image subsequently. The other truncation points are modifiable.

If the response is positive at step E10, then this step is followed by step E11, which is the modification of the current truncation point. The latter is modified by a deterministic function. For this purpose, a key K is used at step E12 in order to generate a pseudo-random binary number $k_j$ using a binary law picking.

If the bit of the message to be inserted is denoted $w_m$, the least significant bit of the truncation point $T_{ij}$ is replaced by the bit $k_j \oplus w_m$, where $\oplus$ represents the exclusive OR symbol. In this case, the modified index $T'_{ij}$ is equal to $T_{ij} \pm 1$.

In the previous example, the modification depends on the block $B_j$ and on the key K. In a variant, it can also depend on the previously processed blocks, in the same layer or in the previous layers.

Step E11 is followed by step E13, which is the updating of the list of truncation points. This list is situated in the header of the current layer $C_i$.

At the following step E14, the parameter m is incremented by one unit in order to consider a following bit to be inserted.

The following step E15 is a test for determining whether there remain truncation points in the current layer to be considered. If the response is positive, then this step is followed by step E16 in order to consider a following truncation point. Step E16 is followed by the previously described step E10.

When the response at step E15 is negative, this means that all the truncation points of the current layer have been processed. Step E15 is then followed by step E17, which is the formation of the layer $C_i$ with the modified truncation points.

Step E17 is followed by step E18, which is a test for determining if there remains at least one layer to be processed. If the response is positive, then this step is followed by step E19 in order to consider the following layer. Step E19 is followed by the previously described step E8.

When all the layers have been processed, then the binary stream containing the inserted message is formed.

A message insertion which is incremental in the different layers is described. This may correspond to a message, part of which is judged to be important and which is consequently inserted in the first layer. The other parts of the message, judged to be less important, are inserted in the following layers.

As a variant, it is possible to insert a message solely in a single layer, notably the first layer of the binary stream, which will in general be the first processed when the message is extracted. The message will then be extracted very rapidly. In addition, during a transmission, not all the layers are necessarily transmitted. In such a case, having inserted the message in the first layer only makes it possible to find it after transmission.

This variant can notably be used when the purpose of inserting the message is to authenticate the image.

According to another variant, it is possible to insert the same message in each of the layers of the binary stream, so as to obtain redundant information and consequently to increase the robustness of the message inserted.

According to another variant, the modification of the truncation point depends on at least one characteristic of the data block associated with this truncation point. This characteristic must be able to be found again exactly at the time of extraction.

For example, for each block $B_j$, there are considered an initial secret key $K_0$, the number $M_j$ of truncation points for which there is no information, and the sum $P_j$ of the coefficients of the first non-zero bit plane of this block.

Then the key $K=K_0+M_j+P_j$ is used to make a pseudo-random binary picking. The insertion is then identical to that described previously.

In place of the sum of the coefficients of the first non-zero bit plane of the block, any deterministic function calculated from these coefficients can be used, such as the variance of these coefficients.

Pirating the inserted message is thus more difficult, since the insertion of the message also depends on the coded data.

This variant can notably be used when the purpose of the insertion of the message is to authenticate the image.

Another advantage of this variant is to make it possible to locate spatially in the image any undesired modifications made subsequently to the image. There too, this can be useful for authenticating the image.

According to another variant, the two least significant bits of the truncation points are modified.

According to yet another variant, the deterministic modification function can also take account of at least one characteristic of the previously processed blocks. This characteristic can be the truncation point, the number of non-significant bit planes or the variance of the previously processed blocks. Thus the blocks are "linked" together and the inserted message is more difficult to pirate.

The algorithm of FIG. 7 depicts the general functioning of the message extraction device according to the invention and includes steps E20 to E31.

This algorithm can be stored in whole or in part in any information storage means capable of cooperating with the microprocessor. This storage means can be read by a computer or by a microprocessor. This storage means is integrated or not into the device, and may be removable. For example, it may include a magnetic tape, a diskette or a CD-ROM (fixed-memory compact disc).

Step E20 is an initialisation at which the parameter i is initialised to one and the parameter m is initialised to one.

The parameters i and m have the same meaning as in FIG. 4. Thus the parameter i is an integer which is the index of a current layer amongst the previously formed layers. The parameter i varies between 1 and NC, where NC is an integer equal to the number of layers in the binary stream.

The parameter m is an integer which is the index of the inserted bit. It should be noted that the number of bits which it is possible to insert in each layer is variable, and therefore to the total number, or capacity, is also variable.

The following step E21 is the reading of the list of truncation points $T^*_{ij}$ situated in the header of the current layer $C_i$.

The following step E22 is an initialisation at which the parameter j is set to one. The parameter j has the same meaning as in FIG. 4 and represents the current index of the truncation point.

The following step E23 is a test for determining whether the current truncation point $T^*_{ij}$ is modifiable. The criterion applied is the same as at insertion.

If the response is negative, then step E23 is followed by step E24, which is a test for checking whether there remain truncation points to be processed. If the response is positive, then this step is followed by step E25, in order to consider a following truncation point. Step E25 is followed by the previously described step E23.

If the response is negative at step E24, then this step is followed by step E26 which is a test for determining whether all the layers have been processed. As long as there remains at least one layer to be processed, step E26 is followed by step E27 in order to consider a following layer. Step E27 is followed by the previously described step E21.

When the response is positive at step E23, then this step is followed by step E28, which is the reading of the bit which was inserted in the current truncation point.

For this purpose, as at insertion, a key K is used at step E29 in order to generate a pseudo-random binary number $k_j$. The binary number is used at step E28 in order to extract an inserted bit $w^*_m$. The extraction depends on the deterministic function which was used during the prior insertion. With the example which was disclosed with reference to FIG. 4, the extraction consists of reading the least significant bit of the current truncation point $T^*_{ij}$. If the least significant bit is equal to one, then the extracted bit $w_m$ is equal to $k_j$, otherwise the extracted bit $w_m$ is equal to $1-k_j$.

The extracted bit is stored in memory.

The following step E30 is an incrementation of the parameter m in order to consider a following extracted bit.

Step E30 is followed by the previously described step E24.

When at step E26 all the layers have been processed, it is then possible to deduce the capacity and step E26 is followed by step E31, which is the decoding of the message. For example, if it is known that it is composed of ASCII characters, the extracted bits are grouped together in groups of eight bits, and one ASCII character is associated with each group.

It should be noted that, with this method, it is always possible to extract bits from a coded file and more particularly a compressed one. The coherence and veracity of the message extracted depend on the authenticity of the file processed.

The different variants disclosed for the message insertion are transposed for extraction.

It should be noted that the purpose of extraction may be simply to extract the message or to authenticate the image which contained it.

Naturally, the present invention is in no way limited to the embodiments described and depicted, but quite the contrary encompasses any variant within the capability of a person skilled in the art.

The invention claimed is:

1. A method of inserting supplementary information in the form of a binary message in a set of data representing physical quantities, the data having been processed by the steps of:
   partitioning the set into subsets,
   entropic coding each of the subsets,
   selecting, for each of the subsets, a compression rate and distortion pair according to a global compression rate or a global distortion, and
   writing, for each of the subsets, an index representing the selected compression rate and distortion pair, in a file containing the coded subsets,
   further comprising a step of modifying the index representing the selected compression rate and distortion pairs, before said writing step, the modification including replacement of the least significant bit of the index by an information bit having a value that is a function of the supplementary information and of at least one characteristic of the subset.

2. Insertion method according to claim 1, further comprising, prior to said modifying step, a test step of verifying whether the compression rate and distortion pairs selected are modifiable according to a modification criterion.

3. Insertion method according to claim 1, in which the entropic coding is performed by bit planes.

4. Method according to claim 2, in which the modification criterion is not verified for a selected compression rate and distortion pair if the pair belongs to the first non-null bit plane.

5. Method according to claim 2, in which the modification criterion is not verified for a selected compression rate and distortion pair if the pair belongs to the last bit plane.

6. Insertion method according to claim 1, in which the value of the information bit is also a function of at least one characteristic of the previously processed subsets.

7. Insertion method according to claim 6, in which the value of the information bit is also a function of a secret key.

8. Insertion method according to claim 1, the file containing the coded subsets including several layers, in which only the compression rate and distortion pairs corresponding to the first layer are modified according to the supplementary information.

9. Insertion method according to claim 1, the file containing the coded subsets including several layers, in which the compression rate and distortion pairs corresponding to different layers are modified according to the supplementary information.

10. Insertion method according to claim 9, in which, for each of the layers, the compression rate and distortion pairs are modified according to the same supplementary information item.

11. Insertion method according to claim 1, in which the supplementary information item is an authentication information item.

12. Method of extracting supplementary information inserted in a set of data representing physical quantities by the method according to claim 1, comprising the steps of:
   reading, for each of the subsets, the index representing the compression rate and distortion pair; and
   extracting the supplementary information.

13. Storage medium storing a program for implementing the method according to claim 1.

14. A device for inserting supplementary information in the form of a binary message in a set of data representing physical quantities, the data having been processed by:
- means of partitioning the set into subsets,
- means of entropic coding each of the subsets,
- means of selecting, for each of the subsets, a compression rate and distortion pair according to a global compression rate or a global distortion, and
- means of writing, for each of the subsets, an index representing the selected compression rate and distortion pair, in a file containing the coded subsets,
- further comprising means of modifying the index representing the selected compression rate and distortion pairs, before writing the index, the modification including replacement of the least significant bit of the index by an information bit having a value that is a function of the supplementary information and of at least one characteristic of the subset.

* * * * *